United States Patent [19]

Pousette et al.

[11] 4,424,840
[45] Jan. 10, 1984

[54] ROLLER FEED DEVICE WITH BEARING CARTRIDGE

[75] Inventors: Ronald D. Pousette, Vancouver; John L. Sanders, North Vancouver, both of Canada

[73] Assignee: Brunette Machine Works Ltd., New Westminster, Canada

[21] Appl. No.: 348,993

[22] Filed: Feb. 16, 1982

[51] Int. Cl.³ .......................... B27L 1/00; B27B 31/00
[52] U.S. Cl. ................................ 144/246 F; 308/178; 308/236; 464/178
[58] Field of Search ................ 308/178, 236; 464/178, 464/73; 144/246 F, 208 E, 340

[56] References Cited

U.S. PATENT DOCUMENTS 2,857,945 10/1958 Brundell et al. .
4,307,583 12/1981 Hail ..................................... 464/178

Primary Examiner—W. D. Bray
Attorney, Agent, or Firm—Kolisch, Hartwell & Dickinson

[57] ABSTRACT

A roller feed device in a log-feed assembly. The device includes an elongated arm having an inner mounting end and an outer roll-carrying end. Formed in the outer end region of the arm is an elongated cavity which receives a bearing cartridge by axial movement of the cartridge toward the arm's inner end. The cartridge includes a bearing-journaled shaft which is detachably coupled, at its inner end, to a drive train in the arm, with axial insertion of the cartridge into the cavity. A feed roll in the device is detachably mounted on the outer end of the cartridge shaft for rotation thereon. Removal of the feed roll from the cartridge shaft provides access required for detachment of the cartridge from the arm.

2 Claims, 3 Drawing Figures

ROLLER FEED DEVICE WITH BEARING CARTRIDGE

BACKGROUND AND SUMMARY

The present invention relates to a roller feed device having an elongated swing arm, and a feed roll mounted for powered rotation at the swinging end of the arm, and particularly, to novel structure used in such a device for journaling the feed roll on the arm.

In the usual log-debarking system, a log is fed along a transport axis through a debarking ring by a pair of log-feed assemblies mounted on opposite sides of the ring. Typically, each assembly includes three elongated roller feed devices which are mounted for cooperative swinging of their outer ends toward and away from the transport axis. Each device is composed of an elongated swing arm, and a spiked feed roll journaled on the outer end of the arm for engaging the surface of a log. The feed rolls are rotated to advance a log along the transport axis. A characteristic operational feature of a log-feed assembly of this type is that the feed rolls experience considerable radially directed shock as the roller arms encounter log surface irregularities.

In one type of roller feed device known in the prior art, the feed roll is mounted directly on the output shaft of a gear reducer which is carried adjacent the outer end of the arm. A problem with this construction is that radially directed shock experienced by the feed roll is transmitted directly to the gear reducer in the arm, with the result that the gear reducer experiences significant abuse, and may require frequent repair or replacement.

More recently a log-feed device having its feed roll carried on a shaft which is journalled on the device's arm and rotatably coupled to a gear reducer in the device has been proposed. This construction functions to transmit radial shock experienced by the feed roll directly to the arm in the apparatus, effectively isolating the gear reducer from all but torsional-load coupling between the gear reducer and the feed roll. While this construction reduces overall maintenance problems, repacking or replacing the bearings which journal the feed roll on the arm can be quite time-consuming, adding considerable cost in terms of down time in a log-debarking system.

An object of the present invention is to provide a roller-feed device which substantially overcomes the above-discussed maintenance problems associated with prior art log-feed devices.

A more specific object of the invention is to provide such a device having a feed roll which is journaled on an arm in the apparatus by a bearing assembly which takes the form of an easily replaceable cartridge.

The device of the invention includes an elongated arm having an inner mounting end and an outer roll-carrying end. Formed in the outer end region of the arm is an elongate cavity dimensioned to receive a bearing cartridge in the device by axial movement of the cartridge toward the arm's inner end. The cartridge includes a shaft which is detachably coupled, at its inner end, to a powered drive shaft in the arm, with insertion of the cartridge axially into the cavity. A feed roll in the device is detachably mounted on the outer end of the cartridge shaft for rotation therewith.

In a preferred embodiment of the invention, the cartridge is secured to the arm by bolts or the like, with removal of the feed roll from the cartridge shaft providing access to such bolts.

These and other objects and features of the present invention will become more fully apparent when the following detailed description of a preferred embodiment of the invention is read in conjunction with the accompanying drawings.

DESCRIPTION OF THE DRAWINGS

FIG. 3 is a fragmentary sectional view similar to FIG. 2, with a bearing cartridge in the invention shown partially removed from an arm.

DETAILED DESCRIPTION OF A PREFERRED EMBODIMENT OF THE INVENTION

Figure 1:
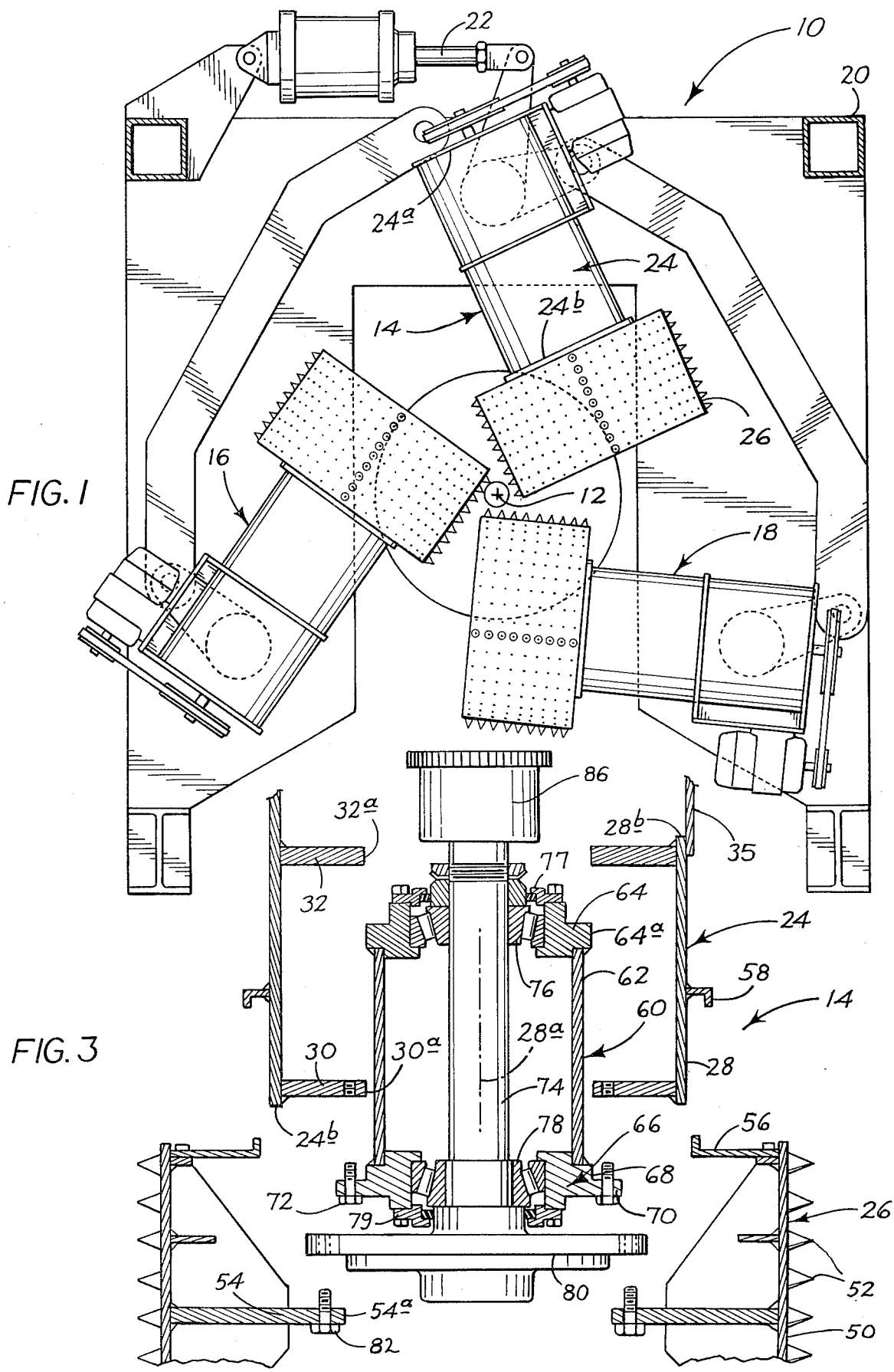
FIG. 1 is a front view of a log-feed assembly having three log-feed devices employing apparatus constructed according to the present invention.

Looking at the figures, and first particularly at FIG. 1, there is shown generally at 10 a log-feed assembly used in a log-debarking system for advancing a log along a log-transport axis 12 extending normal to the plane of the figure. Assembly 10 includes three log-feed devices 14, 16, 18 which are mounted on a frame 20 in the assembly in a well-known manner for coordinated swinging toward and away from axis 12 under the control of an air cylinder 22. Device 14, which is representative, includes an elongated arm 24 having an inner mounting end 24a and an outer swinging end 24b. A spiked feed roll 26 in the device is journaled on the arm, in a manner to be described with reference to the present invention, for powered rotation about the arm's long axis. In operation of assembly 10, a log embraced by the three feed rolls is advanced along axis 12 by powered rotation of the rolls.

Details of the present invention will now be described with reference to device 14. Looking at FIGS. 2 and 3, arm 24 in the device is composed of a tubular section 28 which is preferably formed of tubular steel or the like. The central longitudinal axis of section 28 is indicated by a dash-dot line 28a. Three circular, washer-like mounting members 30, 32, 34 are secured, as by welding, to the interior wall of section 28 at the positions shown. As can be seen best in FIG. 3, member 30 defines a central circular opening 30a adjacent the arm's outer end. Member 32 defines a central circular opening 32a whose diameter is substantially equal to that of opening 30a. Openings 30a, 32a collectively define what is referred to herein as a cavity. A plate 35 in the arm is detachable from section 28 to provide access, through an opening 28b, to a central interior portion of the section, for a purpose to be described.

Figure 2:
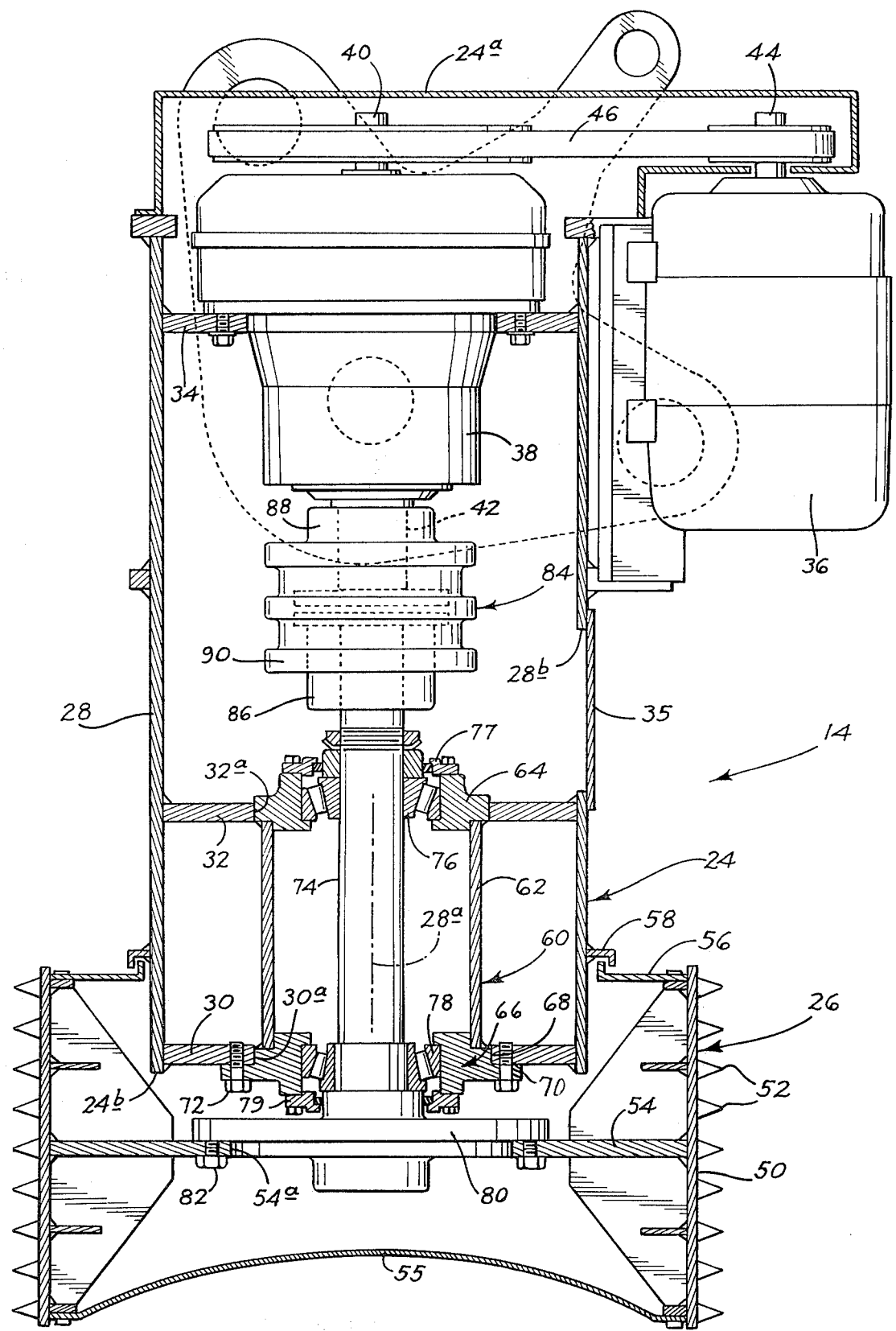
FIG. 2 is an enlarged sectional view of one of the log-feed devices seen in FIG. 1, taken through a plane generally paralleling the plane of FIG. 1.

A drive train in the device includes a motor 36 mounted on the outside of the arm, adjacent the inner end thereof. A gear reducer 38 in the drive train is carried generally within section 28, adjacent the arm's inner end, being secured by bolting to member 34 as shown. Gear reducer 38 provides conventional gear reduction between an input shaft 40 and an output shaft 42, both of which rotate about axis 28a. The gear reducer's input shaft is drivingly connected to the motor's output shaft, designated 44 in FIG. 3, by a flexible belt 46 connecting pulleys carried on the two shafts. Shaft 42, which is also referred to herebelow as a drive shaft, is disposed intermediate members 32, 34, as seen in FIG. 2.

Feed roll 26 is constructed of a rigid cylindrical member 50 whose outer surface is studded with log-engaging spikes, such as spikes 52. A mounting plate 54 in the feed roll is welded to the inner surface of member 50 as shown. The outer end of the feed roll is protected by a removable cover 55. A pair of relatively rotatable annular shield elements 56, 58 mounted on the feed roll and on section 28, respectively, form a rotary seal (FIG. 2) which prevents entry of airborne particles, wood chips and the like into the interior of the spike roll.

Apparatus used in journaling feed roll 26 on arm 24 includes a bearing cartridge 60 composed of a cylindrical casing 62 having welded to its opposite ends, inner and outer bearing mounts 64, 66, respectively. Mount 64, which forms an inner end portion of the cartridge, has an outer cylindrical surface 64a which is dimensioned to be received in opening 32a, in clearance fit therewith, and to pass, with similar clearance through opening 30a.

Mount 66 has an annular step 68 dimensioned to be received slidably in opening 30a, in clearance fit therewith. An annular flange 70 formed in mount 66 confronts the outer face of member 30, with the cartridge in operative position as shown in FIG. 2. The cartridge is secured to arm 24 by bolts, such as bolt 72 extending through matched openings in flange 70 and member 30. Bolts, such as bolt 72, are also referred to herein as means for securing cartridge 60 detachably on arm 24.

A shaft 74 in the cartridge is mounted on casing 62 for rotation about axis 28a by inner and outer bearings 76, 78, respectively. Bearing 76 is clamped in mount 64 by a screwed-on clamping ring 77. Similarly, bearing 78 is clamped in mount 66 by a screwed-on clamping ring 79. Carried on the shaft's output end (the lower end in FIGS. 2 and 3), is a stepped-diameter roll-receiving disc 80 secured to the shaft for rotation therewith. The disc is constructed for its smaller-diameter portion to be received in a central opening 54a in plate 54. The roll is secured to the disc by bolts, such as bolt 82.

Shaft 74 is coupled, at its input end (the upper end in FIGS. 2 and 3) to shaft 42 by a rotary coupling 84. The particular coupling employed herein is a FALK-type coupling composed of a pair of hubs 86, 88 which are mounted, by press fit, on shafts 74, 42, respectively. The two hubs are coupled by a conventional serpentine spring (not shown) which is housed, with confronting portions of the two hubs, in a removable cover 90.

To replace existing bearings, such as bearings 76, 78, coupling 84 is disassembled conventionally to allow axial removal of hub 86 from hub 88. Working access to coupling 84 is provided by opening 28b. The feed roll is detached from shaft 74 by removing cover 55, unbolting the roll from disc 80, and removing the roll axially from the disc, as shown in FIG. 3. Removal of the feed roll exposes bolts, such as bolt 72, which can then be unscrewed to release the cartridge for detachment from the arm by axial movement away from the arm's inner end, as indicated in FIG. 3. The cartridge is detached completely from the arm by axial movement of mount 64 and hub 86 through opening 30a. The device may then be equipped quickly with a totally new cartridge, or may simply have the just-removed cartridge returned with new bearings.

The total cartridge-replacement operation can be performed in a matter of a few minutes, thus substantially eliminating the down time in a log-feed assembly related to repair or replacement of the bearings journaling a feed roll.

While a preferred embodiment of the invention has been described herein, it is apparent that various changes and modifications can be made without departing from the spirit of the invention.

It is claimed and desired to secure by Letters Patent:

1. A roller feed device comprising:
   an elongated arm having an inner mounting end, an outer roll-carrying end and a long axis between said ends,
   means mounted on said arm adjacent its outer end defining a first opening,
   a drive train including a drive shaft mounted on said arm, adjacent said inner end, for powered rotation about the arm's long axis,
   means mounted on said arm defining a second opening intermediate said outer end and said drive shaft,
   a bearing cartridge comprising a casing having an outer end portion releasably secured to said means defining said first opening, an inner end portion disposed within said second opening in clearance fit therewith, a cartridge shaft, and bearing means rotatably mounting said cartridge shaft on said casing,
   coupling means secured to said cartridge shaft, drivingly coupling the same with said drive shaft, and
   a feed roll mounted on said cartridge shaft for rotation therewith,
   said openings being sized for accommodating axial passage of said casing's inner end portion and said coupling means therethrough.

2. The device of claim 1, wherein said feed roll is detachable from said cartridge shaft to expose the means securing said casing releasably to said means defining said first opening.

* * * * *